(No Model.)
G. OLSEN.
VEHICLE WHEEL.
No. 394,718. Patented Dec. 18, 1888.
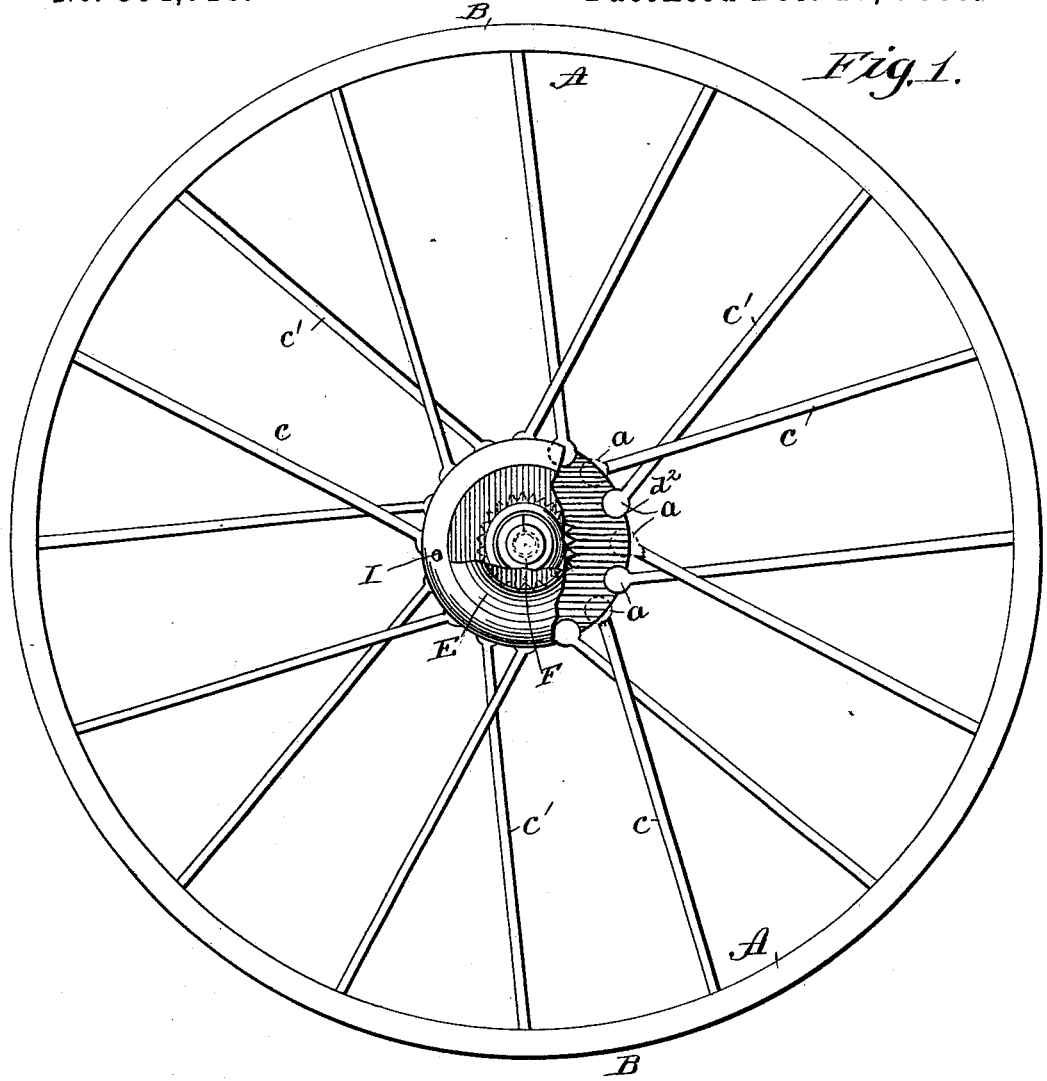
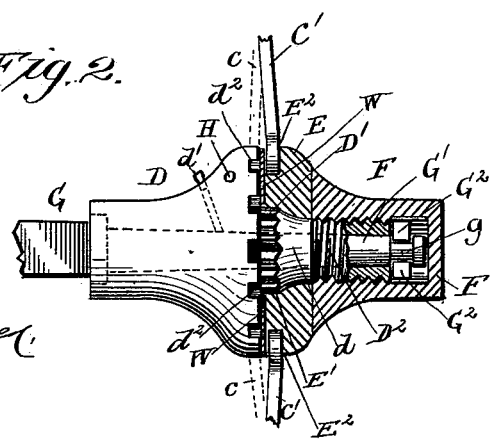
WITNESSES:
INVENTOR:
G. Olsen
BY Munn & Co.
ATTORNEYS.

UNITED STATES PATENT OFFICE.

GUNDER OLSEN, OF HOUGHTON, DAKOTA TERRITORY.

VEHICLE-WHEEL.

SPECIFICATION forming part of Letters Patent No. 394,718, dated December 18, 1888.

Application filed June 7, 1888. Serial No. 276,340. (No model.)

*To all whom it may concern:*

Be it known that I, GUNDER OLSEN, of Houghton, in the county of Brown and Territory of Dakota, have invented a new and Improved Vehicle-Wheel, of which the following is a full, clear, and exact description.

The object of my invention is to provide a wheel the hub and connected parts of which are so arranged that by a slight movement of said hub and parts a force is exerted on the spokes and felly for the purpose of tightening or loosening the tire; also, a wheel so constructed as to exclude dust from the journal; and it consists in the parts which will be hereinafter described, and pointed out in the claims.

Reference is to be had to the accompanying drawings, forming a part of this specification, in which similar letters of reference indicate corresponding parts in both figures.

Figure 1 represents a side elevation of my improved wheel with parts broken away, so as to disclose the inner construction; and Fig. 2 is a view, partly in section, of the hub, axle, &c.

A represents the felly of the wheel, and B the tire.

C indicates one set of spokes, and C' another set. The outer ends of both sets of spokes are engaged to the felly in any suitable manner. The inner end of each spoke is enlarged and rounded, the two faces $a$ being flat. The hub consists of a large inner part, D, and an outer hollow continuation thereof (marked D', $d$, and $D^2$) of less diameter than the part D. The periphery of the part D' is notched. The outer surface of the hub part $D^2$ is screw-threaded. $d$ indicates a smooth tapering part of the hub lying between the notches and screw-threads aforesaid.

$d'$ indicates a plug for closing an opening in the hub D, the said opening communicating with the axle and used to convey oil. The inner face of the hub part D is provided with a series of recesses, $d^2$, at equidistant points. These recesses are in the nature of ball-sockets and each communicates with the outer edge of the hub.

E is a ring, provided on its inner side with teeth or notches E', adapted to engage and lock with the hub-teeth D'. The outer part of the inner side of said ring is smooth and tapering and adapted to fit snugly with the smooth tapering part $d$ of the hub. Both sides of the ring E are flat, and the inner side thereof is provided with a series of ball-sockets, $E^2$. These sockets communicate with the periphery of the ring.

F represents a thimble, screw-threaded on its inner side from its mouth inward for about two-thirds the length of the cavity. The remaining inner part of the cavity is smooth.

G is the axle, and G' the journal thereof. The outer end of the journal is provided with a circumferential groove, $g$, said groove being a seat for a two-part ring or gib, $G^2$.

The inner enlarged and rounded end of each spoke C fits into one of the ball-sockets $d^2$ of the hub, and the inner ends of the spokes C' engage the sockets $E^2$ in the face of the ring E. The arrangement of the inner ends of the spokes and the sockets is such that the outer faces of the spokes are flush with the respective parts with which they are engaged. A washer, W, is interposed between the two adjacent faces D E, so as to present a smooth surface to the outer sides of the inner ends of the spokes. Said washer also serves to hold the spokes in their respective sockets.

It will be observed that there is a difference in the angle of inclination of the two sets of spokes C C'. When the parts are in the position shown in Fig. 2, the hub-teeth D' are in engagement with the ring-notches E', and the thimble F is engaged with the screw-threaded end of the hub. At the same time the two-part ring or gib $G^2$ is engaged in the circumferential groove $g$ on the outer end of the journal. When the said gib is so engaged and the thimble screwed in on the hub, the hub is held in place on the journal.

In order to tighten or loosen the tire the thimble F should be first disengaged from the hub. Then by disengaging the two-part gib-ring $G^2$ from the journal the hub part D and spoke-ring E may be drawn apart, so as to disengage their respective teeth and notches D' E'. When these teeth and notches are disengaged and the hub and ring E turned in opposite directions, the relative positions of the two sets of spokes are changed—that is to say, by turning the hub to the right and the ring to the left the spokes and tire will be tightened, and by a reverse turn of the two parts the spokes and tire are loosened. When the spokes and tire have been placed in the desired position, the hub-teeth D' should be engaged with the notches E' in the ring E. Then by attaching the gib G² to the journal and engaging the thimble F with the hub the several parts are locked, the whole constituting a strong substantial wheel. The hub is provided with two small sockets, H, on opposite sides. The ring E is also provided with similar sockets, I. These sockets are for engaging the points of a wrench when the parts are to be loosened or tightened.

Having thus described my invention, what I claim as new, and desire to secure by Letters Patent, is—

1. A hub composed of two parts secured together and each having a series of circumferential rounding or curved spoke-sockets parallel with the axis of the hub for the inner ends of spokes to pivot in, substantially as set forth.

2. A transversely-divided hub the parts of which have interlocking teeth or projections and circumferential rounding or curved spoke-sockets, whereby the two hub-sections may be turned axially and locked in their adjusted positions, substantially as set forth.

3. The combination, with the rim of a wheel, of a hub adapted to be rotated with respect to the rim and held in its adjusted position, and tangentially-arranged spokes each having an independent pivotal connection at its inner end with the hub, whereby by turning the hub axially the spokes will be thrown outwardly or inwardly to tighten or loosen the rim, substantially as set forth.

4. The combination, with a transversely-divided hub having interlocking teeth or projections between its two parts and circumferential sockets in each part, of the rim of two sets of tangential spokes having rounded inner ends mounted in said sockets, the spokes of one set projecting in a reverse direction to the other set, substantially as set forth.

5. In a wheel, a hub provided with rounded or ball sockets, a set of spokes provided with enlarged or rounded inner ends engaged in said sockets, a ring provided with rounded or ball sockets, a set of spokes provided with enlarged or rounded inner ends engaged in said sockets, the ring being engaged to the hub and adapted to turn thereon, and means for locking said hub and ring, substantially as shown and described.

6. In a wheel, the combination, with the felly, of a hub having a reduced portion and provided with spoke-sockets, a ring provided with spoke-sockets and fitting on and interlocking with the reduced portion of the hub, a cap on the outer end of the said reduced portion, and two sets of spokes engaging the sockets of the hub and ring, the said spokes being crossed, substantially as herein shown and described.

7. In a wheel, a hub having the inner ends of one set of spokes engaged thereto, a ring engaged to said hub and adapted to turn thereon, a set of spokes having their inner ends engaged to said ring, a washer interposed between the ring and hub aforesaid, and means for locking said ring and hub, substantially as shown and described.

GUNDER OLSEN.

Witnesses:
D. C. McKenzie,
F. H. Townsend.